United States Patent [19]
Matsumura et al.

[11] Patent Number: 5,231,262
[45] Date of Patent: Jul. 27, 1993

[54] OPTICAL CUTTING METHOD AND OPTICAL CUTTER

[75] Inventors: Susumu Matsumura, Kawaguchi; Masataka Yashima; Tsuyoshi Santoh, both of Yokohama; Osamu Kanome, Kawasaki; Kazuya Matsumoto, Yokohama, all of Japan

[73] Assignee: Canon Kabushiki Kaisha, Tokyo, Japan

[21] Appl. No.: 938,568

[22] Filed: Aug. 31, 1992

Related U.S. Application Data

[63] Continuation of Ser. No. 672,905, Mar. 21, 1991, abandoned.

[30] Foreign Application Priority Data

Mar. 23, 1990 [JP] Japan .................................. 2-72075

[51] Int. Cl.$^5$ .............................................. B23K 26/14
[52] U.S. Cl. ......................... 219/121.67; 219/121.72; 219/121.77; 219/121.83
[58] Field of Search ............... 219/121.67, 121.72, 219/121.74, 121.76, 121.77, 121.83

[56] References Cited

U.S. PATENT DOCUMENTS 4,777,341 10/1988 Steen et al. ................. 219/121.83
4,969,722 11/1990 Akeel ........................ 219/121.74 X
5,043,553 8/1991 Corfe et al. ................... 219/121.7

FOREIGN PATENT DOCUMENTS 3300208 7/1984 Fed. Rep. of Germany .
63-31847 6/1988 Japan .
64-53788 3/1989 Japan .

OTHER PUBLICATIONS

Patent Abstracts of Japan, vol. 13, No. 244 (M-834), Jun. 7, 1989, Abstract of Japanese Patent No. 1-053788.
Patent Abstracts of Japan, vol. 13, No. 174 (C-589), Apr. 25, 1989, Abstract of Japanese Patent No. 01-004417.
Patent Abstracts of Japan, vol. 12, No. 274 (M-725) (3121) Jul. 29, 1988, Abstract of Japanese Patent No. 63-56379.

*Primary Examiner*—C. L. Albritton
*Attorney, Agent, or Firm*—Fitzpatrick, Cella, Harper & Scinto

[57] ABSTRACT

An optical cutting method includes a step of detecting a center position on a sheet film with a position-detecting light flux; and a step of cutting out a disk film from the sheet film by projecting a cutting laser beam along circumference of a substantially circular form around the detected center position.

20 Claims, 7 Drawing Sheets

OPTICAL CUTTING METHOD AND OPTICAL CUTTER

This application is a continuation of application Ser. No. 07/672,905 filed Mar. 21, 1991, now abandoned.

BACKGROUND OF THE INVENTION

1. Field of the Invention

The present invention relates to an optical cutting method for cutting out a disk-shaped film from a sheet film, and an optical cutter employed therefor.

2. Related Background Art

Optical information-recording-reproducing apparatuses for recording and reproducing information by use of light include ROM type ones allowing reproduction only, WORM type ones (or a DRAW type ones) allowing only one writing operation, erasable type ones allowing repeated writing and erasing, and other types. Any of these types of the apparatuses have characteristics of permitting high-density recording, exchangeability of information recording media, and so forth. Among them, photomagnetic disk apparatuses are highly perfected as an erasable type, and are attracting attention.

In these optical disk apparatuses, a microspot light beam of a size of as small as approximately 1 μm has to be projected onto the information recording face of the optical disk for reproducing and writing information in high density on the disk-shaped optical information recording medium (hereinafter referred to as an "optical disk"). Accordingly, a light-transmissive substrate (usually having a thickness of about 1.2 mm) constituting the optical disk should satisfy severe requirements as to the optical properties, including precision of thickness, uniformity of refractive index, retardation of birefringence, and so forth.

Furthermore, on the light-transmissive substrate, grooves or pre-pits have to be formed for guiding an optical head, which renders the light-transmissive substrate constituting the optical disk expensive. Heretofore, injection-molded polycarbonate resins have been investigated to be used for the light-transmissive substrate having grooves or pre-pits. However, light-transmissive substrates are still expensive because of restrictions on the conditions under which they can be molded and the use of resin components for suppressing the aforementioned birefringence, which makes optical disks expensive and retards the spreading use of optical information-recording-reproducing apparatus.

A method for producing optical disks at a low cost is disclosed in Japanese Patent Publication No. 63-31847. In this method, a film in a form of a wound sheet is employed, and grooves or information pits which have preliminarily been prepared on an original disk are transferred thereon continuously according to a 2P method to produce optical disks at a low cost. In another method for forming grooves or pits on a sheet film, a sheet of a thermoplastic resin is formed by employing a hot roller having an original disk to transfer simultaneously and continuously the grooves or information pits onto the sheet film.

From the sheet film prepared as described above, an individual base film for disk should be cut out with high positional precision without impairing the optical characteristics, especially flatness and low birefringence. However, no apparatus suitable therefor has been found. For example, known stamping machines for stamping out a disk-shaped film by mechanical cutting are not satisfactory in terms of their positional precision. In particular, known stamping machines are unsatisfactory for making optical disks for a peripheral memory device of a computor, which require precision in determining the inside diameter (or concentricity) for inserting a circular metal plate at the center portion of the optical disk.

Moreover, for the purpose of producing optical disks at a high speed and at a low cost, the conventional methods of mechanical cutting cannot simultaneously satisfy the requirements (a), (b), and (c) below:
(a) suitability for a continuous production process,
(b) high precision in the cutting position, and
(c) no deterioration of optical performances required for an optical disk (flatness, low birefringence, etc.).

SUMMARY OF THE INVENTION

An object of the present invention is to provide an optical cutting method which is suitable for cutting out a disk-shaped film from a sheet film continuously with high precision of the cutting without impairment of the optical performance of the disk-shaped film.

Another object of an present invention is to provide a cutting machine suitable for the optical cutting method.

According to an aspect of the present invention, there is provided an optical cutting method comprising a step of detecting a center position on a sheet film with a position-detecting light flux; and a step of cutting out a disk film from the sheet film by projecting a cutting laser beam along the circumference of a substantially circular form around the detected center position.

According to another aspect of the present invention, there is provided an optical cutter comprising a light source emitting a position-detecting light flux; a laser source emitting a cutting laser beam; a position-detecting means for detecting a center position on a sheet film with the position-detecting light flux; and an arm for introducing the cutting laser beam onto the sheet film, the arm rotating around the detected center position.

DESCRIPTION OF THE PREFERRED EMBODIMENT

Figure 1:
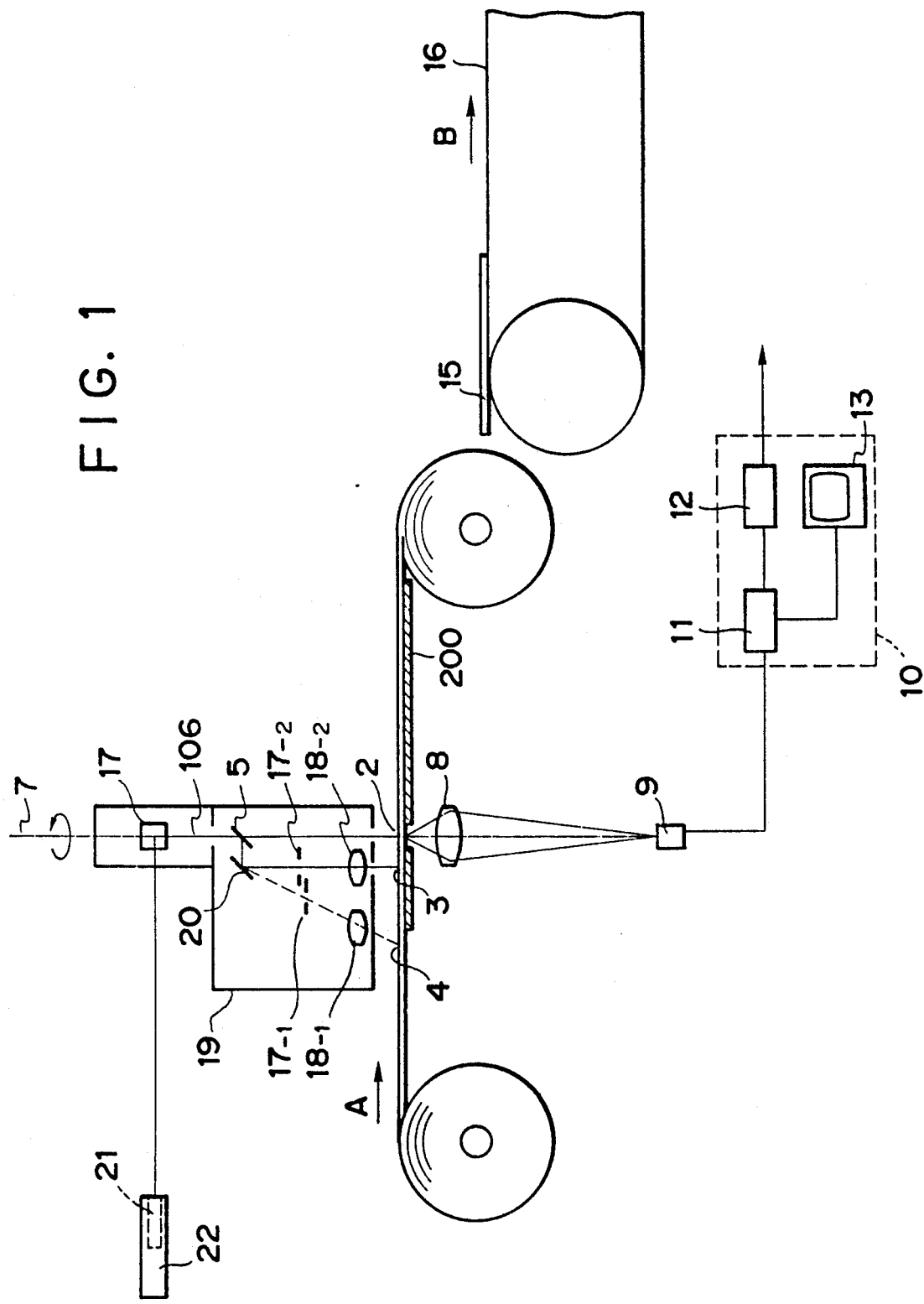
FIG. 1 is a side view of an example of the optical cutter of the present invention.
Figure 2:
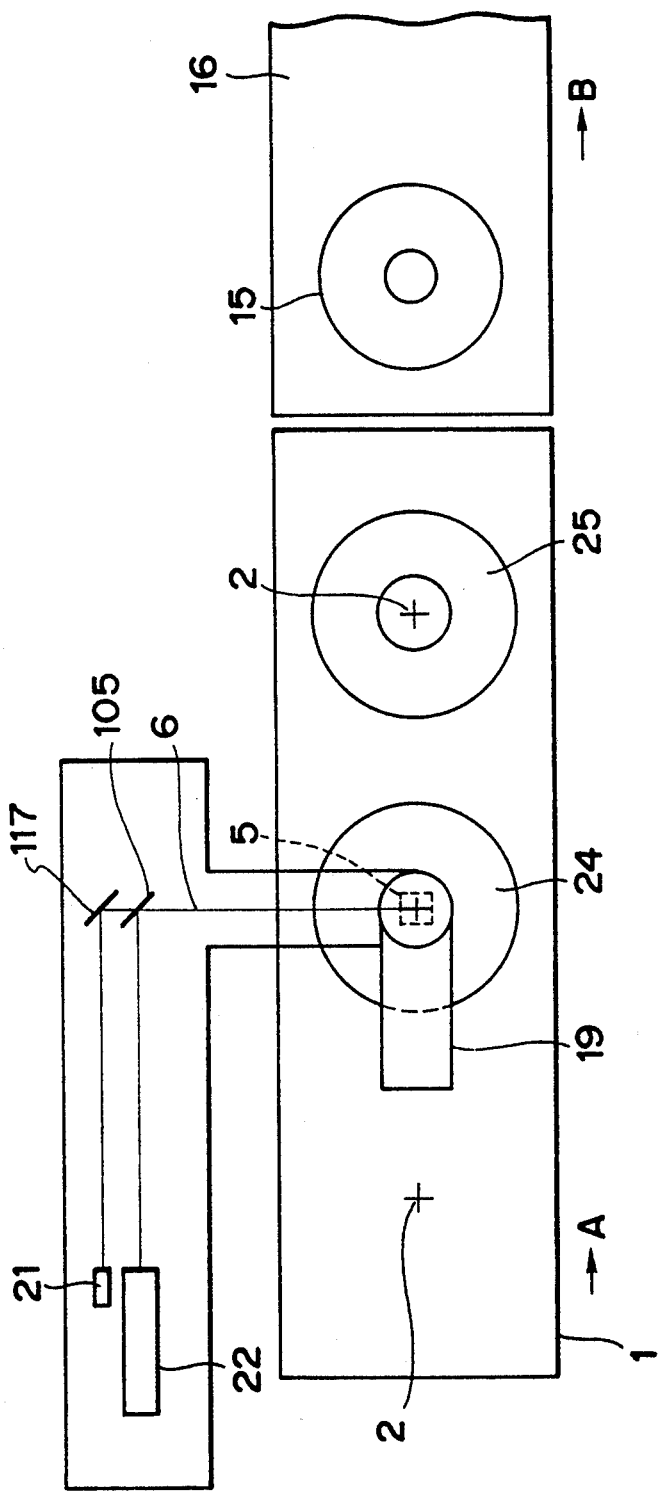
FIG. 2 is a plan view of the optical cutter shown in FIG. 1.

In FIG. 1 and FIG. 2, on the sheet film 1 from which a disk film is to be cut out, a center mark 2 is formed to show the center position of the disk film. The sheet film 1 is pulled out from a rolled state in the direction shown by the arrow mark A, and disk films are cut out from the sheet film. The sheet film moves on a supporting plate 200. Then the sheet film is wound up in a rolled state.

Onto the cut-out disk film to be used as a base film of an optical disk, grooves or pre-pits together with a center mark 2 are transferred from the original disk according to a method, for example, disclosed in Japanese Patent Publication No. 63-31847. In such a manner, the center mark 2 is formed with high precision relative to the grooves or pre-pits.

In the present invention, the center position of the disk film is detected with a position-detecting light flux, for example, with a He-Ne laser beam. The disk film is cut out with a laser beam, for example, with a carbon dioxide laser beam.

The cutting laser beam from the laser beam source 22 and the position-detecting light flux from the light source 21 are reflected respectively by a dichroic mirror 105 and a mirror 117 as shown in FIG. 2, and pass the same light path 6. Thereafter the cutting laser beam and the position-detecting light flux are reflected by a mirror 17 as a first optical system and reach a dichroic mirror 5 as a light flux deflecting means. The position-detecting light flux (e.g., He-Ne laser beam ($\lambda=633$ nm)) is transmitted through the dichroic mirror 5, and introduced along the rotation axis 7 of an arm 19 to illuminate the center mark 2 on the sheet film 1 below. The light path 106 of the light flux reflected by the mirror 17 coincides with the rotation axis 7. The position of the center mark 2 is detected by the position-detecting means as such that an image of the center mark 2 is formed by an image-forming lens 8 on an image pick-up tube 9 and coincidence of the center mark 2 with the center position is determined by means of an image processor 10.

The image processor 10, which comprises a frame memory 11, a CPU 12, and a monitor CRT 13, will conduct sampling of a TV signal from the image pick-up tube 9 and memorizes it as a digital data. The arm 19 integrated with the image-forming lens 8 and the image pick-up tube 9 is moved by a position-registration means, such as a known XY slider, not shown in the figure, until the center mark 2 is determined to be on the center of the image pick-up tube 9. When the center mark 2 is determined to be in the correct position, the light shutter 17-2 opens to form a light spot 3 of the cutting laser beam on the sheet film material 1 by an objective lens 18-2. In this state, the arm 19 rotates one round around the rotation axis 7 by a rotation driving means, not shown in the figure, to cut an inner circumference of the disk film by the light spot 3.

Thereafter, the light shutter 17-2 closes, and the mirror 20 rotates at a predetermined angle, and the light shutter 17-1 opens to form a light spot 4 of a cutting laser beam on the sheet film material 1 by an objective lens 18-1. In this state, the arm 19 rotates again one round around to cut an outer circumference of the disk film by the light spot 4. The mirror 20, the pairs of the light shutters 17-1 and 17-2 and the objective lenses 18-1 and 18-2 constitute a second optical system.

FIG. 2 is a plan view of this apparatus. The light flux from the light source 21 and the laser beam from the laser source 22 are superposed and made to pass together through the light path 6, and reach the dichroic mirror 5. In FIG. 2, the mirror 17 is not shown. On the sheet film 1, a plurality of center marks 2 are formed. In the figure the disk film 24 is just being cut out, and the disk film 25 has already been cut out.

The arm 19 rotates around the rotation axis 7 together with the dichroic mirror 5, the mirror 20, light shutters 17-1 and 17-2, and a pair of the objective lenses 18-1 and 18-2 held thereon. The disk film 15 having been cut out is delivered in the direction shown by the arrow mark A and then delivered by a belt conveyor 16 moving in the direction shown by the arrow mark B to the next process, where an optical disk is completed, for example, by laminating layers such as a recording layer or a protective layer on the disk film base 15.

The determination of the coincidence of the center mark 2 with the rotation center of the arm 19 is made by the image processor 10 of the position-detecting means. This determination can be made with sufficient precision according to a known image-processing technique such as a template method.

In the example, the rotation speed of the arm 19 is decided depending on the light intensity distributions of the two light spots 3 and 4 formed, for example, by a carbon dioxide laser beam, and on the thickness of the sheet film 1 to be cut out. A carbon dioxide gas laser enables extremely high-speed cutting because of its high intensity of the output light beam.

For further improving the positional precision, another position mark may be formed in addition to the center mark 2 of the disk film 24, for example, at a position in the vicinity of the outer circumference of the disk film 24 where no inconvenience in use is caused by employing a position-detecting means and a position-detecting light flux.

Figure 3:
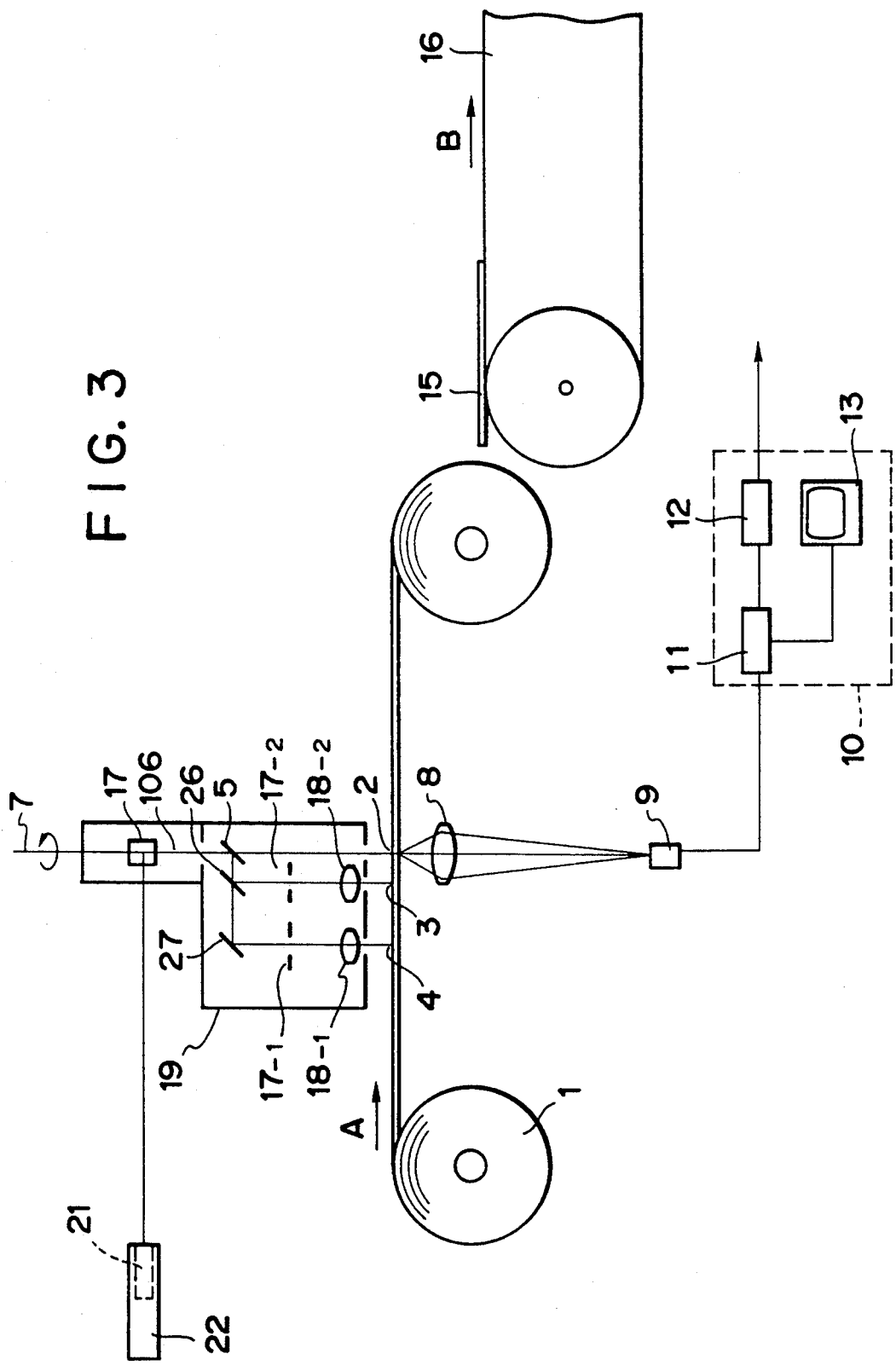
FIG. 3 is a side view of another example of the optical cutter of the present invention.

FIG. 3 shows a second example of the present invention. The same designation numbers as in the first example are given to the same members. In the first example, the inner circumference portion 15a of the disk film 15 is cut clearly, while the outer circumference portion 15b thereof may be cut in so as to taper, because of the oblique introduction of a cutting incident beam, as shown by the cross-sectional view of the disk film 15 after the cutting in FIG. 4. This disadvantage is cancelled in this example.

In FIG. 3, the cutting laser beam reflected by a dichroic mirror 5 is projected by a half mirror 26 and a mirror 27 perpendicularly onto a sheet film 1, forming two light spots 3 and 4. Accordingly, with the rotation of the dichroic mirror 5 with the arm 19, both the inner circumference portion and the outer circumference portion are scanned and cut simultaneously by perpendicularly introduced light spot, which enables shortening of the processing time.

Figures 4, 5:
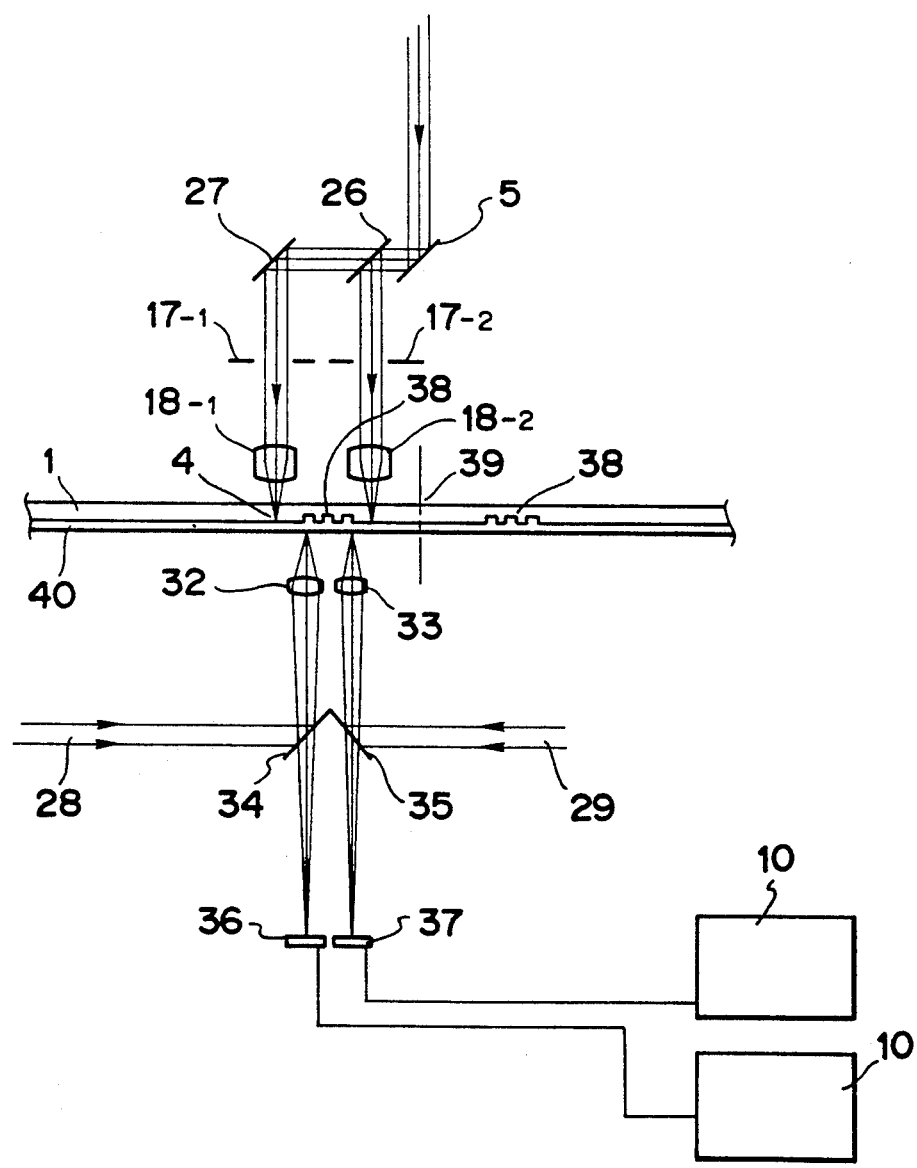
FIG. 4 is a cross-sectional view of an example of a disk film having been cut out by the optical cutter shown in FIG. 1.
FIG. 5 is a side view of still another optical cutter of the present invention.

FIG. 5 shows a third example of the present invention, in which the position-detecting light flux is changed from the type shown in FIG. 3 without changing the type of the cutting light beam. In the third example, the position-detecting light fluxes 28 and 29 are introduced through light paths separate from the paths of the cutting laser beam, and are respectively reflected by the half mirrors 34 and 35, detecting respectively the outer boundary and the inner boundary of the groove region 38 formed on the sheet film 1. In the third example shown in FIG. 5, the center position 39 of the disk film to be cut out is detected by utilizing the grooves or the pre-pits formed on the sheet film 1. Additionally, in the example shown in FIG. 5, a layer constitution 40 is formed including a recording layer and a protective layer on the sheet film 1, thereby completing the formation of an optical disk only by cutting out the sheet film in a disk shape.

In FIG. 5, the center position 39 is detected as described below. The position-detecting light fluxes 28 and 29 are reflected by the sheet film 1, and the images of the reflected light are formed by the image-forming lenses 32 and 33 respectively on CCD line sensors 36 and 37. The diffracted light at grooves 38 is reduced because of the diffraction of light to the outside of the pupils of the image-forming lenses 32 and 33 (or in other words, the f-numbers of the image-forming lenses 32 and 33 are designed to meet this requirement). On the other hand, in the portion having no grooves 38, the diffracted light is bright because of no loss of quantity of in the light by diffraction. Accordingly, the region having grooves 38 is determined from the output wave form of the CCD line sensors 36 and 37.

In principle, the center position 39 of the disk can be determined by detecting either one of the inner circumference of the region having the grooves 38 (hereinafter referred to as a "inner groove circumference") or the outer circumference of the region (hereinafter referred to as a "outer groove circumference"). In this example, however, the center position 39 is determined from the positions of both of the inner groove circumference and the outer groove circumference for decreasing the measurement error in the position-detecting means.

Figure 6:
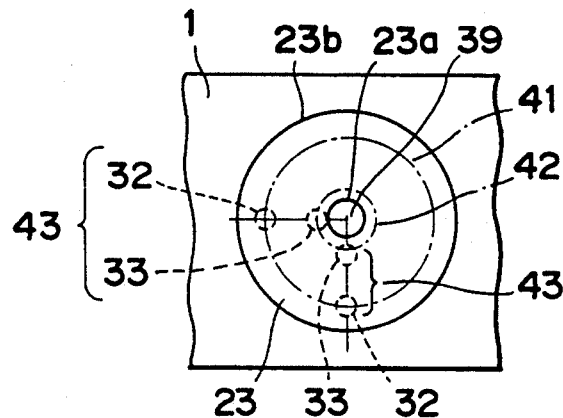
FIG. 6 is a plan view illustrating an example of a positional relation of a sheet film with a position-detecting means.

FIG. 6 is a plan view of an optical disk to be cut out. The outer groove circumference 41, the inner groove circumference 42, and the inner circumference 23a and the outer circumference 23b of the optical disk 23 to be cut are shown in FIG. 6. In the example shown in FIG. 6, two position-detecting units 43 respectively having a pair of image-forming lenses 32 and 33, a CCD line sensor, not shown in the figure, and position-detecting light fluxes for the pair of the image-forming lenses are 32 and 33 equipped in two directions perpendicular to each other. The constitution of each of the detecting unit 43 is the same as shown in FIG. 5. The two position-detecting units 43 in perpendicular directions are employed for preventing a possible error in detecting the center position 39 which may be caused, when only one detecting unit 43 is used, by positional deviation of the optical disk 23 in a vertical direction in the figure.

Figure 7:
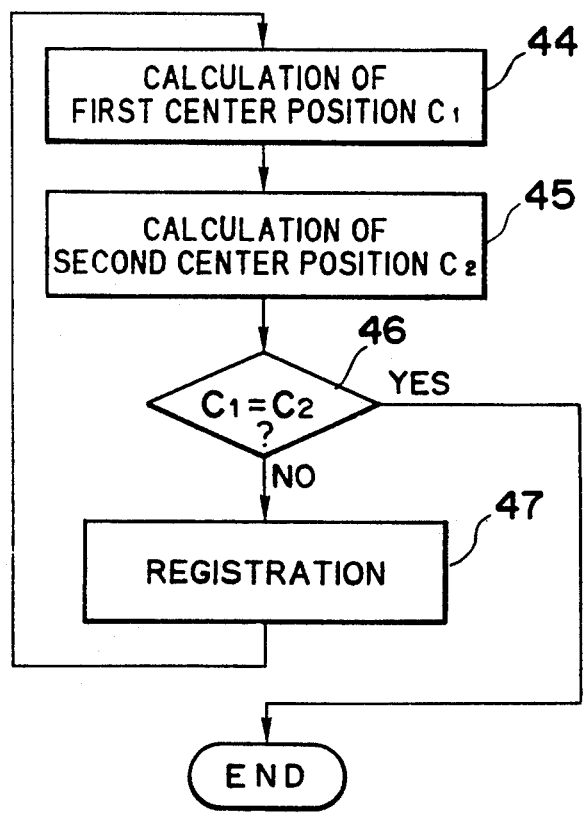
FIG. 7 is a flow chart of a program of judgement in center detection.

FIG. 7 shows a determining program flow chart for determining whether or not the center position 39 of the optical disk 23 coincides with the rotation axis 7 of the arm 19 of the optical cutter. In the step 44, the output from a first position-detecting unit is processed to determine the position of the first center $C_1$ $(X_1, Y_1)$. In the same manner, in the step 45, the output from a second position-detecting unit is processed to determine the position of the second center $C_2$ $(X_2, Y_2)$. In the step 46, a determination is made as to whether the center position $C_1$ coincides with the center position $C_2$ within a permissible error (e.g., 10 μm). If the two centers are determined to coincide, the optical disk 23 to be cut out is considered to be set in a correct position, and is subjected to cutting. If the two centers are determined not to coincide, the deviations in the X direction and the Y direction are respectively determined in the step 47, and the arm 19 of the optical cutter and the position-detecting means are moved to cancel the deviations by a registration means not shown in the figure. Thereafter the step 44 starts again.

Figure 8:
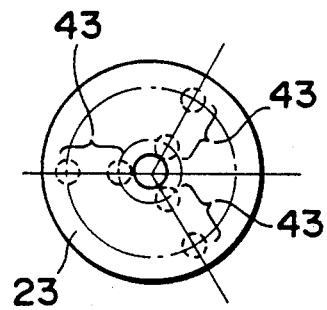
FIG. 8 and FIG. 9 illustrate respectively a further example of positional relation of a sheet film with a position-detecting means.
Figure 9:
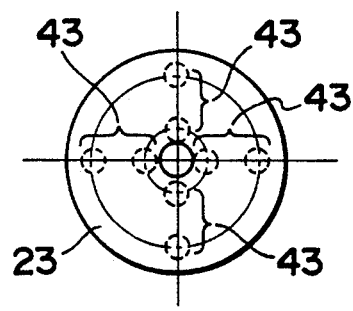

For detecting the center position 39 of the optical disk more precisely, three or more position-detecting units 43 may be employed as shown in FIG. 8 and FIG. 9.

Figure 10:
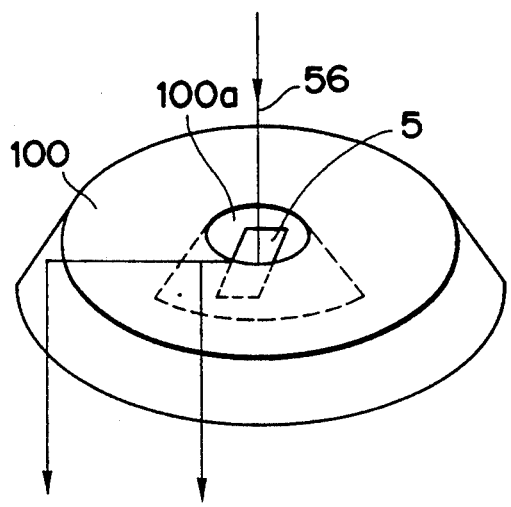
FIG. 10 is an oblique view of an example of the mirror for dividing the laser beam.
Figure 11:
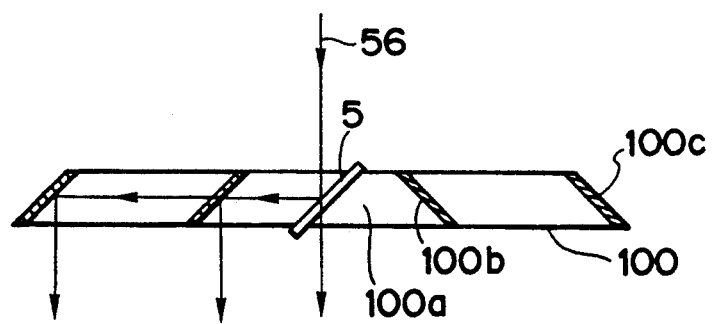
FIG. 11 is a cross-sectional view of the mirror shown in FIG. 10.

FIG. 10 and FIG. 11 show a mirror 100 which has both the function of the half mirror 26 and the function of the mirror 27 shown in FIG. 3. The mirror 100 is in a shape of a truncated cone having a through-hole 100a in the center. The inside wall 100b forming the through-hole 100a is parallel to the outside wall 100c of the mirror 100. The inside wall 100b serves as a half mirror corresponding to the half mirror 26, and the outside wall 100c serves as a mirror corresponding to the mirror 27. The region between the inside wall 100b and the outside wall 100c is a space. In the case when the mirror 100 is employed instead of the half mirror 26 and the mirror 27 shown in the FIG. 3, a dichroic mirror 5 is provided inside the through-hole 100a, and the axis 56 of the mirror 100 is made to be the same as the rotation axis 7.

By use of the mirror 100, the scanning of the light spots 3 and 4 can be made only by rotating the dichroic mirror 5 and the objective lenses 18-1 and 18-2 together with the arm 19 without rotating the mirror 100, so that the the arm 19 may be made light-weight, and high-speed cutting may be made feasible.

The cutting method of the present invention, which is constituted as described above, is suitable for a continuous process, and achieves high precision of a cutting position without deterioration of the optical performance of an optical disk.

What is claimed is:

1. An optical cutting method of cutting a circular article from a sheet film comprising:
    a step of specifying a center position of the article with a plurality of position-detecting units to make the center positions of the article obtained from each position-detecting unit coincide, said plurality of position-detecting units capable of detecting an outside and an inside of grooves or pre-pits formed on the surface of the sheet film with two position-detecting light fluxes; and
    a step of rotating a cutting laser beam with the specified center position as the rotational center.

2. The optical cutting method of claim 1, wherein a position-detecting light flux is a laser beam.

3. The optical cutting method of claim 1, further comprising the steps of forming a center mark at the center position on the sheet film, and detecting the center mark with a position-detecting light flux.

4. The optical cutting method of claim 1, further comprising the step of detecting the grooves or pre-pits with a position-detecting light flux to determine the center position.

5. The optical cutting method of claim 1, further comprising the step of detecting the center position by use of a plurality of position-detecting light fluxes.

6. The optical cutting method of claim 1, further comprising the step of dividing the cutting laser beam into a plurality of beams which are simultaneously used for cutting.

7. An optical cutter for cutting a circular article from a sheet film comprising:
    means for specifying a center position of the article, said means comprising a plurality of position-detecting units and means for making the center positions of the article obtained from each position-detecting unit coincide, each position-detecting unit comprising two light sources for emitting position-detecting light fluxes, each position-detecting unit being capable of detecting an outside and an inside of grooves or pre-pits formed on the surface of the sheet film with the position-detecting light fluxes;

a laser source for emitting a cutting laser beam; and an arm for introducing the cutting laser beam to the sheet film, said arm being rotatable around the specified center.

8. The optical cutter of claim 7, wherein the position-detecting light fluxes are a laser beam.

9. The optical cutter of claim 7, further comprising means for detecting the center position by use of a plurality of position-detecting light fluxes.

10. The optical cutting method of claim 7, further comprising means for dividing the cutting laser beam into a plurality of beams which are simultaneously used for cutting.

11. An optical cutting method of cutting a doughnut-shaped article from a sheet film comprising:

a step of determining a center position of the article on the sheet film with position-detecting light fluxes;

a step of forming a plurality of cutting laser spots on the surface of the sheet film by dividing a cutting laser beam into a plurality of laser beams with laser dividing means; and a step of rotating a plurality of the laser spots with the determined center position as the rotational center.

12. The optical cutting method of claim 11, wherein said step of determining a center position of the article comprises a step of specifying a center position of the article with a plurality of position-detecting units to make the center positions of the article obtained from each position-detecting unit coincide, each position-detecting unit being capable of detecting an outside and an inside of grooves or pre-pits formed on the surface of the sheet film with two position-detecting light fluxes.

13. The optical cutting method of claim 11, wherein said step of forming a plurality of the cutting laser spots on the surface of the sheet film comprises the step of forming cutting laser spots on the inside and the outside of a region where pre-pits or grooves, or both, are formed on the surface of sheet film.

14. The optical cutting method of claim 11, wherein the doughnut-shaped article is an optical disc.

15. The optical cutting method of claim 11, wherein said step of determining the center position of the article comprises the step of determining a center position of the article by detecting a center mark formed on the surface of sheet film with the position-detecting light fluxes.

16. An optical cutter for cutting a doughnut-shaped article from a sheet film comprising:

means for detecting a center position of the article on the sheet film with position-detecting light fluxes, said means comprising a light source for emitting the position-detecting light flux;

a laser source for emitting a cutting laser beam; and an arm for introducing the cutting laser beam onto the sheet film, said arm comprising means for dividing the cutting laser beam into a plurality of cutting laser beams to form a plurality of the cutting laser spots on the surface of the sheet film, and a lens for focusing the divided laser beams onto the surface of the sheet film, said arm being rotatable with the detected center position as the rotational center.

17. The optical cutter of claim 16, wherein said means for detecting a center position of the article comprises means for specifying the center position of the article, said detecting means comprising a plurality of position-detecting units and means for making the center positions of the article obtained from each position-detecting unit coincide, each position-detecting unit comprising two light sources for emitting position-detecting light fluxes, each position-detecting unit being capable of detecting an outside and an inside of grooves or pre-pits formed on the surface of the sheet film with the position-detecting light fluxes.

18. The optical cutter of claim 16, wherein said means for detecting the center position comprises means for detecting a center mark formed on the surface of the sheet film with the position-detecting light fluxes, to detect the center position.

19. The optical cutter of claim 16, wherein the doughnut-shaped article is an optical disc.

20. An optical cutter for cutting a doughnut-shaped article from a sheet film comprising:

a laser light source for emitting a cutting laser beam;

means for detecting a center position of the article on the sheet film with position-detecting light fluxes, said means having a light source for emitting the position-detecting light fluxes;

means for dividing the cutting laser beam to form two cutting laser spots on the surface of the sheet film, wherein said dividing means is in the shape of a truncated cone having a center-hole having a trapezoidal cross-section and comprises a half mirror formed in an inside wall thereof, and a mirror formed in an outside wall thereof, wherein the region between the inside wall and the outside wall is formed to be a space;

a lens for focusing the laser beams as divided by said dividing means onto the sheet film; and a mirror for introducing the cutting laser beam into said dividing means, said introducing mirror being provided in the center hole of said dividing means, said lens and said introducing mirror being rotatable with the center position as the rotational center.

* * * * *